UNITED STATES PATENT OFFICE.

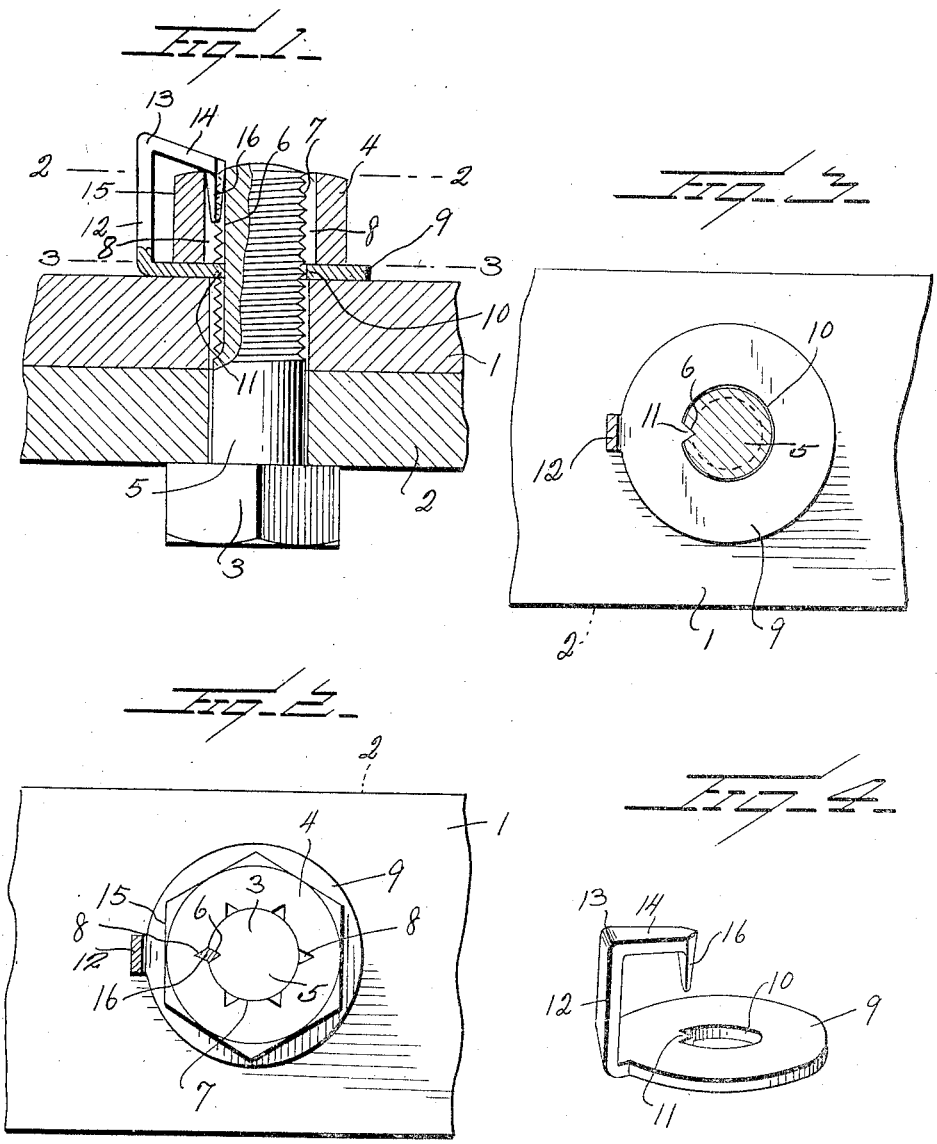

BLISS W. MARR, OF DETROIT, MICHIGAN.

NUT-LOCK.

1,382,306. Specification of Letters Patent. Patented June 21, 1921.

Application filed October 11, 1920. Serial No. 416,110.

*To all whom it may concern:*

Be it known that I, BLISS W. MARR, a citizen of the United States, residing at Detroit, in the county of Wayne and State of Michigan, have invented certain new and useful Improvements in Nut-Locks, of which the following is a specification, reference being had to the accompanying drawings.

The present invention has for its purpose provision of means mounted on the shank of a bolt between a member to be clamped and a nut, and connections with the nut and the shank of the bolt, to lock the nut in place and prevent its removal.

As another purpose it is the aim to provide a locking device consisting of a lock washer provided with a tongue to engage a groove in the shank of the bolt, said groove being deeper than the threads of the shank of the bolt.

Another purpose is the provision of an extension formed integrally with the lock washer and adapted to be bent over any one of the faces of the nut and terminating in a lug which is diamond shaped in cross section and tapered, to be driven in engagement with the groove of the shank of the bolt and any one of the grooves of the interior surface of the bore of the nut, thereby preventing turning of the nut.

A further purpose embodies the idea that should the tongue of the lock washer become broken, therefore no engagement with the groove in the shank of the bolt, the nut would still remain locked, as the lug of the extension remains in a wedging engagement between the nut and the groove of the shank of the bolt.

Still further the invention aims to provide a nut locking device, wherein should the extension become broken at a point between the lock washer and the lug of the extension, the nut would still remain locked, as the diamond shaped lug of the extension still remains in wedging engagement with the groove of the shank of the bolt and one of the grooves of the nut.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a sectional view through a pair of members to be clamped secured together by a nut and bolt, and showing the improved nut locking device as applied and constructed in accordance with the invention.

Fig. 2 is a sectional view on line 2—2 of Fig. 1, therefore showing the extension in section, and the nut and the end of the shank of the bolt in elevation, the diamond-shaped lug also being in section.

Fig. 3 is a sectional view on line 3—3 of Fig. 1, showing the tongue of the washer in engagement with the groove of the shank of the bolt.

Fig. 4 is a detail perspective view of the lock washer.

Referring more especially to the drawing, 1 and 2 designate two members clamped together by means of the bolt 3 and nut 4, which is threaded in the usual manner from the shank 5 of the bolt. The shank of the bolt is provided with a longitudinally extending elongated V-shaped groove 6, the depth of which is greater than the depth of the threads of the shank. Furthermore the groove 6 extends along the shank the length of the threads thereof, as shown clearly in Fig. 1.

The threaded bore 7 of the nut 4 is provided with a plurality of diametrically opposite V-shaped grooves 8, any one of which is designed to register with the V-shaped groove 6 of the shank of the bolt.

Interposed between the member 1 to be clamped and the nut 4 is a circular or otherwise shaped lock washer 9, which is provided with a central opening 10 for the reception of the shank of the bolt, when the washer is applied. It will be noted, as shown clearly in Fig. 1, the washer 9 is of a thickness, to prevent the washer from engaging between the threads of the shank of the bolt. The marginal edge of the opening 10 of the lock washer, at a suitable location is provided with a V-shaped tongue or lug 11, which is designed to engage the V-shaped groove 6 of the shank of the bolt.

The outer marginal edge of the lock washer at a suitable location thereon has integral therewith an extension 12. The lock washer 9 is designed to be constructed of relatively hard metal, but while the extension 12 is designed to have a reasonable amount of strength and rigidity, it is capable of being relatively easily bent, for the reasons to follow, which will be obvious from an inspection of the construction of the device shown in the drawing. The extension 12 is designed to extend laterally from the body of the lock washer, as shown clearly in Fig. 1, and may be bent, in order that it may perform its required functions. This extension 12 is bent at 13, in order to provide the part 14. It will be still further seen that the extension 12 is adapted to overlie any one of the flat faces 15 of the nut, and spaced therefrom as shown. Furthermore the extension 12 between the point where it is bent from the washer 9 and the bend 13 is of a length relatively greater than the thickness of the nut, so that the portion 14, when disposed as shown in Fig. 1 overlies and extends toward the nut and the end of the shank of the bolt. In other words the portion 14 is disposed in a plane or direction extending at acute angle to the body of the lock washer. The portion 14 terminates in a tapered lug 16, which is diamond-shaped in cross section. When any one of the grooves 8 is in registration with the groove 6 of the shank of the bolt, an opening diamond-shaped in contour is afforded. This diamond-shaped opening caused to be formed by the registration of one of the grooves 8 and the groove 6 receives the diamond-shaped lug 16. The lug 16 is adapted to be driven in engagement with the diamond-shaped opening, so as to have a wedging engagement therewith. It will be noted that the extension 12 is formed with the washer 9 at a point opposite the tongue 11, so that when the washer is applied with its tongue 11 in engagement with the groove 6, the extension 12 will be in a position, so that its lug 16 will be capable of engaging the diamond-shaped opening caused to be formed by the registering grooves 6 and 8. The groove 6 performs the double function of receiving the tongue 11 and the lug 16, therefore should the tongue 11 become broken, the nut 4 will still remain locked, owing to the wedging engagement of the lug 16 with the registering grooves of the shank and the nut. Also should the extension 12 become broken at a point between the washer 9 and the lug 16, the nut will still remain locked, owing to the wedging engagement of the lug 16 with the diamond-shaped opening. The extension 12 at a point between where it is bent from the washer 9 and the opening 13 is made of a length greater than the width of the nut, and spaced from the nut, so that the portion 14 may be easily manipulated, to force the tapered diamond-shaped lug 16 in engagement with the diamond-shaped opening. After engaging the end of the lug 16 partially within the diamond-shaped opening, it may be driven the rest of the way into the opening, by means of a hammer or any other suitable tool, hence it will have a wedging engagement in the opening, and therefore prevent turning of the nut, though the extension 12 should become broken. The taper of the lug 16 has been more or less aggregated, so as to clearly show that the lug 16 is intended to be tapered, but in reality or in actual practice the lug 16 may be less tapered, and in this case, it will be obvious that wedging action of the lug 16 of the diamond-shaped opening will be greater, than may be gleaned from the present illustration. Furthermore the groove 6 is of a greater depth than the spaces between the threads of the shank, so as to prevent the tongue 11, should it be thin enough, from engaging and fitting around the spaces between the threads of the tongue, which would permit the lock washer to move relative to the shank.

The invention having been set forth, what is claimed as being useful is:—

1. The combination with a bolt having a shank provided with a longitudinally extending groove, of a nut threaded on the shank having its bore provided with a plurality of diametrically opposite grooves, any one of which being registrable with the groove of the shank, a lock washer on the shank between the nut and a member to be clamped and having means to engage the groove of the shank, said lock washer having an extension overlying the nut and terminating in a lug engageable wedgedly with the registering grooves of the shank and the nut, thereby preventing detachment of the nut.

2. The combination with a bolt having a shank provided with a longitudinally extending groove, of a nut threaded on the shank and having a plurality of grooves in its bore, any one of which being registrable with the groove of the shank, said grooves being V-shaped, so that when in registration, a diamond-shaped opening is formed, a lock washer on the shank between a member to be clamped and the nut and having means to engage the longitudinal groove of the shank, said lock washer having an extension overlying the nut and terminating in a lug diamond-shaped in cross section to fit the diamond-shaped opening formed by the two registering grooves of the nut and shank.

3. The combination with a bolt having a longitudinally extending groove of a depth greater than the space between the threads of the shank, of a nut engaged with the shank and having its bore provided with a plurality of grooves, any one of which being registrable with the groove of the shank.

a lock washer on the shank between the nut and a member to be clamped and having a tongue to engage the groove of the shank, said lock washer being of a thickness greater than the spaces between the threads of the shank, thereby preventing the washer from engaging and turning in the threads of the shank, said lock washer having an extension overlying the nut and terminating in means wedgedly engageable with the registering grooves of the nut and the shank.

4. The combination with a bolt having a shank, of a nut threaded thereon, a lock washer on the shank engaging between the nut and a member to be clamped and having means engaged with the shank to prevent rotation of the washer relatively to the shank, the shank of the bolt and the bore of the nut having registering grooves, a lock washer having an extension overlying the nut and being bent and terminating in a lug to be disposed parallel with the shank and engaged wedgedly with the registering grooves, thereby preventing the nut from turning.

In testimony whereof I hereunto affix my signature.

BLISS W. MARR.